(12) United States Patent
Shimizu

(10) Patent No.: US 6,252,678 B1
(45) Date of Patent: Jun. 26, 2001

(54) IMAGE FORMATION METHOD

(75) Inventor: Osamu Shimizu, Shizuoka (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/141,112

(22) Filed: Aug. 27, 1998

(30) Foreign Application Priority Data

| Aug. 27, 1997 | (JP) | .................................................. 9-231275 |
| Sep. 30, 1997 | (JP) | .................................................. 9-266795 |
| Jan. 7, 1998 | (JP) | ............................................... 10-001761 |

(51) Int. Cl.$^7$ ............................. H04N 1/407; B41J 2/355
(52) U.S. Cl. ......................... 358/1.9; 358/456; 358/459; 358/460; 347/184
(58) Field of Search .......................... 358/1.9, 460, 457, 358/459, 535, 456, 298, 534; 347/183, 184, 126, 251, 254, 131

(56) References Cited

U.S. PATENT DOCUMENTS

| 5,073,966 | 12/1991 | Sato ..................................... 382/232 |
| 5,287,209 | 2/1994 | Hiratsuka et al. ..................... 358/1.9 |
| 5,394,252 | 2/1995 | Holladay et al. ..................... 358/533 |

FOREIGN PATENT DOCUMENTS

| 0 680 195 | 11/1995 | (EP) | ................................ H04N/1/40 |
| 0 720 350 | 7/1996 | (EP) | ................................ H04N/1/52 |
| 0 761 434 | 3/1997 | (EP) | ................................ B41F/15/00 |
| 7-117359 | 5/1995 | (JP) | ................................ B41M/5/30 |
| 9-1866 | 1/1997 | (JP) | ................................ B41J/2/52 |
| 2608808 | 2/1997 | (JP) | ................................ H04N/1/405 |
| WO 95/02938 | 1/1995 | (WO) | ................................ H04N/1/41 |

Primary Examiner—Scott Rogers
(74) Attorney, Agent, or Firm—Sughrue, Mion, Zinn, Macpeak & Seas, PLLC

(57) ABSTRACT

A method for forming an image comprises the steps of dividing an inputted image into a plurality of unit areas, preparing at least five gradation conversion tables relating a density value of the density data to a dot generation energy value corresponding to a size of a dot to be printed, preparing a matrix dividing each of the unit areas into predetermined number of element areas, dividing each of the unit areas into predetermined number of the element areas by means of the matrix, assigning one of the plurality of gradation conversion tables to each of the element area in each of the unit area, and recording the dots converted from the density data, wherein the plurality of conversion tables are prepared in such a manner that there exists at least three converted energy values other than the minimum and the maximum values thereof at an arbitrary density value in halftone density, and wherein the plurality of conversion tables are prepared in such a manner that the number of element areas in which the minimum value of the converted energy is assigned is more than half of the number of all the element areas at the minimum density level having the maximum value of the converted energy.

15 Claims, 17 Drawing Sheets

M AND Y

FIG. 15

GRADATION CONVERSION TABLE 1 (FOR BK MATRIX)

| | X | A | B | C | D | E | F | G | H | I | J | K | L | M | N | O | P |
|---|---|---|---|---|---|---|---|---|---|---|---|---|---|---|---|---|---|
| 0 | 0 | 1 | 1 | 1 | 1 | 1 | 1 | 1 | 1 | 1 | 1 | 1 | 1 | 1 | 1 | 1 | 1 |
| 1 | 0 | 2 | 1 | 1 | 1 | 1 | 1 | 1 | 1 | 1 | 1 | 1 | 1 | 1 | 1 | 1 | 1 |
| 2 | 0 | 4 | 1 | 1 | 1 | 1 | 1 | 1 | 1 | 1 | 1 | 1 | 1 | 1 | 1 | 1 | 1 |
| 63 | 0 | 63 | 63 | 63 | 51 | 36 | 21 | 1 | 1 | 1 | 1 | 1 | 1 | 1 | 1 | 1 | 1 |
| 64 | 0 | 63 | 63 | 63 | 53 | 38 | 23 | 1 | 1 | 1 | 1 | 1 | 1 | 1 | 1 | 1 | 1 |
| 65 | 0 | 63 | 63 | 63 |   |   |   | 1 | 1 | 1 | 1 | 1 | 1 | 1 | 1 | 1 | 1 |
| 127 | 0 | 63 | 63 | 63 | 63 | 63 | 63 | 63 | 63 | 48 | 15 | 1 | 1 | 1 | 1 | 1 | 1 |
| 128 | 0 | 63 | 63 | 63 | 63 | 63 | 63 | 63 | 63 | 51 | 18 | 1 | 1 | 1 | 1 | 1 | 1 |
| 129 | 0 | 63 | 63 | 63 |   |   |   | 63 | 63 |   |   | 1 | 1 | 1 | 1 | 1 | 1 |
| 191 | 0 | 63 | 63 | 63 | 63 | 63 | 63 | 63 | 63 | 63 | 63 | 63 | 45 | 12 | 1 | 1 | 1 |
| 192 | 0 | 63 | 63 | 63 | 63 | 63 | 63 | 63 | 63 | 63 | 63 | 63 | 47 | 14 | 1 | 1 | 1 |
| 193 | 0 |   |   |   |   |   |   | 63 | 63 |   |   |   |   |   | 1 | 1 | 1 |
| 253 | 0 | 63 | 63 | 63 | 63 | 63 | 63 | 63 | 63 | 63 | 63 | 63 | 63 | 63 | 63 | 59 | 56 |
| 254 | 0 | 63 | 63 | 63 | 63 | 63 | 63 | 63 | 63 | 63 | 63 | 63 | 63 | 63 | 63 | 61 | 60 |
| 255 | 48 | 63 | 63 | 63 | 63 | 63 | 63 | 63 | 63 | 63 | 63 | 63 | 63 | 63 | 63 | 63 | 63 |

FIG. 16

GRADATION CONVERSION TABLE 2 (FOR BK MATRIX)

| GRADATION STEP AFTER CONVERSION | PULSE WIDTH [μs] |
|---|---|
| 0 | 0 |
| 1 | 170 |
| 2 | 185 |
| 15 | 380 |
| 16 | 395 |
| 17 | 410 |
| 31 | 620 |
| 32 | 635 |
| 33 | 650 |
| 61 | 1070 |
| 62 | 1085 |
| 63 | 1100 |

FIG. 17

GRADATION CONVERSION TABLE 1 (FOR C MATRIX)

| X | A | B | C | D | E | F | G | H | I | J | K | L |
|---|---|---|---|---|---|---|---|---|---|---|---|---|
| 0 | 0 | 1 | 1 | 1 | 1 | 1 | 1 | 1 | 1 | 1 | 1 | 1 |
| 1 | 0 | 2 | 1 | 1 | 1 | 1 | 1 | 1 | 1 | 1 | 1 | 1 |
| 2 | 0 | 4 | 1 | 1 | 1 | 1 | 1 | 1 | 1 | 1 | 1 | 1 |
| 63 | 0 | 63 | 1 | 1 | 1 | 1 | 1 | 1 | 1 | 1 | 1 | 1 |
| 64 | 0 | 127 | 124 | 84 | 44 | 4 | 1 | 1 | 1 | 1 | 1 | 1 |
| 65 | 0 | 127 | 127 | 87 | 47 | 7 | 1 | 1 | 1 | 1 | 1 | 1 |
| 127 | 0 | 127 | 127 | | | | 87 | 47 | 7 | 1 | 1 | 1 |
| 128 | 0 | 127 | 127 | 127 | 127 | 127 | 88 | 48 | 8 | 1 | 1 | 1 |
| 129 | 0 | 127 | 127 | 127 | 127 | 127 | 89 | 49 | 9 | | | |
| 191 | | | | | | | | 89 | 49 | 9 | 1 | 1 |
| 192 | 0 | 127 | 127 | 127 | 127 | 127 | 127 | 90 | 50 | 10 | 1 | 1 |
| 193 | 0 | 127 | 127 | 127 | 127 | 127 | 127 | 127 | | | | 106 |
| 253 | | | | | | | 127 | 127 | 127 | 127 | 118 | 113 |
| 254 | 0 | 127 | 127 | 127 | 127 | 127 | 127 | 127 | 127 | 127 | 123 | 120 |
| 255 | 96 | 127 | 127 | 127 | 127 | 127 | 127 | 127 | 127 | 127 | 127 | 127 |

FIG. 18

GRADATION CONVERSION TABLE 2 (FOR C MATRIX)

| GRADATION STEP AFTER CONVERSION | PULSE WIDTH [μs] |
|---|---|
| 0 | 0 |
| 1 | 214 |
| 2 | 225 |
| 15 | |
| 16 | 379 |
| 17 | 390 |
| 31 | |
| 32 | 555 |
| 33 | 566 |
| 63 | 896 |
| 64 | 907 |
| 65 | 918 |
| 125 | 1578 |
| 126 | 1589 |
| 127 | 1600 |

FIG. 19

GRADATION CONVERSION TABLE 1 (FOR M MATRIX)

| X | A | B | C | D | E | F | G | H |
|---|---|---|---|---|---|---|---|---|
| 0 | 0 | 1 | 1 | 1 | 1 | 1 | 1 | 1 |
| 1 | 0 | 2 | 1 | 1 | 1 | 1 | 1 | 1 |
| 2 | 0 | 4 | 1 | 1 | 1 | 1 | 1 | 1 |
| ... | | | | | | 1 | | |
| 63 | 0 | 122 | 74 | 26 | 1 | | | 1 |
| 64 | 0 | 125 | 77 | 29 | 1 | 1 | 1 | 1 |
| 65 | 0 | | | 31 | 1 | 1 | 1 | 1 |
| 127 | 0 | 127 | 127 | 127 | 87 | 39 | 1 | 1 |
| 128 | 0 | 127 | 127 | 127 | 89 | 41 | 1 | 1 |
| 129 | | | | | 90 | 42 | 1 | 1 |
| 191 | 0 | 127 | 127 | 127 | 127 | 113 | 65 | 17 |
| 192 | 0 | 127 | 127 | 127 | 127 | 114 | 66 | 18 |
| 193 | | | | | | 115 | 67 | 19 |
| 253 | 0 | 127 | 127 | 127 | 127 | 127 | 127 | 121 |
| 254 | 0 | 127 | 127 | 127 | 127 | 127 | 127 | 124 |
| 255 | 96 | 127 | 127 | 127 | 127 | 127 | 127 | 127 |

FIG. 20

GRADATION CONVERSION TABLE 2 (FOR M MATRIX)

| GRADATION STEP AFTER CONVERSION | PULSE WIDTH [ μs ] |
|---|---|
| 0 | 0 |
| 1 | 258 |
| 2 | 275 |
| 15 | |
| 16 | 513 |
| 17 | 530 |
| 31 | |
| 32 | 785 |
| 33 | 802 |
| 63 | 1312 |
| 64 | 1329 |
| 65 | 1346 |
| 125 | 2366 |
| 126 | 2383 |
| 127 | 2400 |

FIG. 21

GRADATION CONVERSION TABLE 1 (FOR Y MATRIX)

| | X | A | B | C | D | E | F | G | H |
|---|---|---|---|---|---|---|---|---|---|
| 0 | 0 | 1 | 1 | 1 | 1 | 1 | 1 | 1 | 1 |
| 1 | 0 | 2 | 1 | 1 | 1 | 1 | 1 | 1 | 1 |
| 2 | 0 | 4 | 1 | 1 | 1 | 1 | 1 | 1 | 1 |
| | | | | | | | 1 | | |
| 63 | 0 | 123 | 75 | 27 | 1 | | | | 1 |
| 64 | 0 | 126 | 78 | 30 | 1 | 1 | 1 | 1 | 1 |
| 65 | 0 | | | 32 | 1 | 1 | 1 | 1 | 1 |
| 127 | 0 | 127 | 127 | 127 | 108 | 60 | 12 | 1 | 1 |
| 128 | 0 | 127 | 127 | 127 | 110 | 62 | 14 | 1 | 1 |
| 129 | 0 | | | | 111 | 63 | 15 | 1 | 1 |
| 191 | 0 | 127 | 127 | 127 | 127 | 127 | 90 | 42 | 1 |
| 192 | 0 | 127 | 127 | 127 | 127 | 127 | 92 | 44 | 1 |
| 193 | | | | | | 127 | 93 | 45 | |
| 253 | 0 | 127 | 127 | 127 | 127 | 127 | 127 | 123 | 117 |
| 254 | 0 | 127 | 127 | 127 | 127 | 127 | 127 | 125 | 122 |
| 255 | 96 | 127 | 127 | 127 | 127 | 127 | 127 | 127 | 127 |

FIG. 22

GRADATION CONVERSION TABLE 2 (FOR Y MATRIX)

| GRADATION STEP AFTER CONVERSION | PULSE WIDTH [μs] |
|---|---|
| 0 | 0 |
| 1 | 258 |
| 2 | 275 |
| 15 | |
| 16 | 513 |
| 17 | 530 |
| 31 | |
| 32 | 785 |
| 33 | 802 |
| 63 | 1312 |
| 64 | 1329 |
| 65 | 1346 |
| 125 | 2366 |
| 126 | 2383 |
| 127 | 2400 |

IMAGE FORMATION METHOD

BACKGROUND OF THE INVENTION

1. Technical Field of the Invention

The present invention relates to an image formation method and in particular to an image formation method effective for providing a record image of high quality.

2. Description of Related Art

In recent years, full-color laser beam printers and thermal transfer printers have been rapidly finding spreading use as output terminals of personal computers, workstations, etc. In this case, required performance includes the capability of outputting text data, line drawing data, and image data, namely, continuous-tone output is required.

As this kind of system, for example, a system disclosed in Unexamined Japanese Patent No. Hei 9-1866 is well known.

The system divides an image into a plurality of blocks, changes the input/output characteristics corresponding to the positions of pixels therein for each block, converts image data density level into density level to recorded dots, and changes and disperses the positions where dots of the same size are recorded for each block, thereby preventing appearance of structural pattern in the image such as moire.

Basically, the conventional system is a kind of a pseudo area gradation technique using a multilevel dither method having only less discrete density level. When, the configuration as described above is adopted, characteristics such as, size and, placement regularity of recorded dots is weakened as much as possible, thereby preventing appearance of structural pattern in the image such as moire.

In more detail, image data is converted from R(red), G(green), and B(blue) of brightness data into density data of three primary colors of C(cyan), M(magenta), and Y(yellow) for printing, then an under color is removed for preparing a black plate based on the density data, and C, M, Y, and BK (black) data is prepared. Further, correction processing such as masking is applied, then gradation processing is executed in such a manner that the pixels at the positions in the block described above are divided into odd and even lines and different gradation conversion table characteristics are applied to each of the lines.

However, in the system, the gradation conversion table characteristics are monotonous, thus occurrence of roughness is inevitable when low-density recorded pixels are formed on a white background.

The system assumes that a printed matter has stable characteristics. In fact, it is necessary to consider printing on a printed matter for which is hard to say that its characteristics are always stable. That is, with photosensitive material for thermal developing or photo-thermal-sensitive recording material, even if energy at the minimum level required for recording is given, the threshold as to whether or not color is developed varies due to variation in sensitivity caused by humidity, etc., and the print result becomes delicately different.

SUMMARY OF THE INVENTION

It is therefore an object of the present invention to provide an image formation method which can also be used for printing on a printed matter which is hard to say that its characteristics are always stable and is effective for providing a high-quality recording image.

In order to achieve the above object, there is provided a method for forming an image comprising the steps of: dividing an inputted image into a plurality of unit areas; preparing at least five gradation conversion tables relating a gradation value of the inputted image to a dot generation energy value corresponding to a size of a dot to be printed; preparing a matrix dividing each of the unit areas into predetermined number of element areas; dividing each of the unit areas into a predetermined number of the element areas by means of the matrix; assigning one of the plurality of gradation conversion tables to each of the element areas in each of the unit area; and recording dots according to the dot generation energy value obtained from the assigned gradation conversion table, wherein the plurality of conversion tables are prepared in such a manner that there exists at least three converted energy values other than a minimum and a maximum energy value at an arbitrary density value in halftone density, and wherein the plurality of conversion tables are prepared in such a manner that a number of element areas in which the minimum value of the converted energy is assigned is more than half of the number of all the element areas when a minimum density level has the maximum value of the converted energy.

In the method, the inputted image data may include a plurality of color plate image data, and all the above steps may be executed with respect to each of the color plate image data. The plurality of color plate image data may be image data of cyan, magenta, yellow and black plates.

Here, there may be prepared at least three kinds of matrixes in which the numbers of the element areas arranged in one of the horizontal direction and the vertical direction thereof are different from each other.

With respect to one of the color plate image data, the assignment of the plurality of conversion tables to the each of the element areas are executed randomly. The one color plate image data is a color plate image data having the least density, specifically, the yellow color plate data.

In the method, with respect to the color plate image data other than the one color plate image data (e.g. the yellow color plate), the assignment of the plurality of conversion tables to the each of the element areas are executed based on a predetermined rule. The predetermined rule is different from each other in the color plate image data.

Accordingly, even if recorded pixels at low density are formed on a white background, occurrence of roughness can be decreased remarkably. Therefore, the image formation method can also be used for printing on a printed matter for which it is hard to say that characteristics thereof are always stable, and can provide a high-quality recording image.

BRIEF DESCRIPTION OF THE DRAWINGS

In the accompanying drawings:

FIG. 15 is an illustration to show one example of a gradation conversion table for gradation conversion with respect to the conversion characteristic of BK;

FIG. 16 is an illustration to show one example of a gradation conversion table for pulse width assignment with respect to the conversion characteristic of BK;

FIG. 17 is an illustration to show one example of a gradation conversion table for gradation conversion with respect to the conversion characteristic of C;

FIG. 18 is an illustration to show one example of a gradation conversion table for pulse width assignment with respect to the conversion characteristic of C;

FIG. 19 is an illustration to show one example of a gradation conversion table for gradation conversion with respect to the conversion characteristic of M;

FIG. 20 is an illustration to show one example of a gradation conversion table for pulse width assignment with respect to the conversion characteristic of M;

FIG. 21 is an illustration to show one example of a gradation conversion table for gradation conversion with respect to the conversion characteristic of Y;

FIG. 22 is an illustration to show one example of a gradation conversion table for pulse width assignment with respect to the conversion characteristic of Y.

DETAILED DESCRIPTION OF THE PREFERRED EMBODIMENT

Referring now to the accompanying drawings, there are shown preferred embodiments of the present invention.

Figure 1:
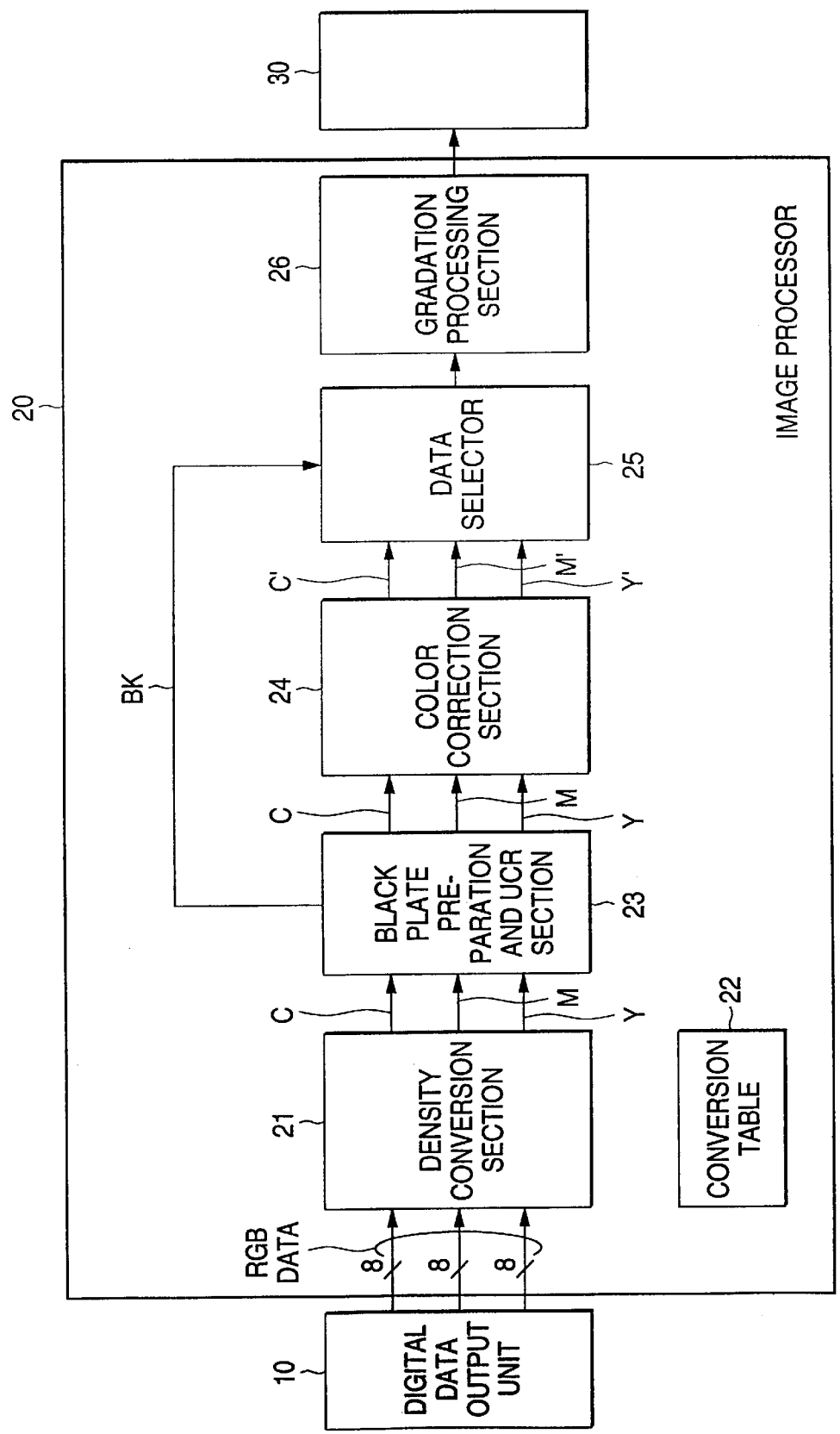
FIG. 1 is a block diagram to show a schematic configuration of a color image formation system for realizing an image formation method according to the present invention.

FIG. 1 is a block diagram to show a schematic configuration of a color image formation system for realizing an image formation method according to one embodiment of the present invention.

In FIG. 1, numeral 10 is a digital data output unit at the preceding stage, numeral 20 is an image processor, and numeral 30 is a thermal transfer printer. The data on which image processing is performed in the image processor 20 is a total of 24 bits of eight R bits, eight G bits, and eight B bits.

The image processor 20 has a density conversion section 21, a conversion table 22, a black plate preparation and under color removal (UCR) section 23, a color correction section 24, a data selector 25, and a gradation processing section 26.

When the thermal transfer printer 30 is started, digital image data is output from the digital data output unit 10 to the image processor 20.

The image data inputted to the image processor 20 (RGB brightness data) is converted into density data of C, M, and Y of three primary colors for printing by the density conversion section 21 using the conversion table 22.

Next, the CMY density data is sent to the black plate preparation and UCR section 23, which then performs under color removal for preparing a black (BK) plate. Resultantly, the black plate preparation and UCR section 23 outputs C, M, Y, and BK density data.

Then, the CMY density data is inputted to the color correction section 24 and undergoes processing such as masking. In FIG. 1, the CMY density data undergoing the processing is shown as C', M', Y'.

Next, the data selector 25 selects only one color data from among the C', M', Y', and BK density data and inputs the selected data to the gradation processing section 26.

The gradation processing section 26 performs processing of introducing a screen angle to prevent moire into the input data and processing of converting the input data into a special density value using a gradation conversion table described later.

The processing of introducing a screen angle to prevent moire is similar to processing performed hitherto and will not be discussed again. The conversion processing using a gradation conversion table will be discussed.

Figure 2:
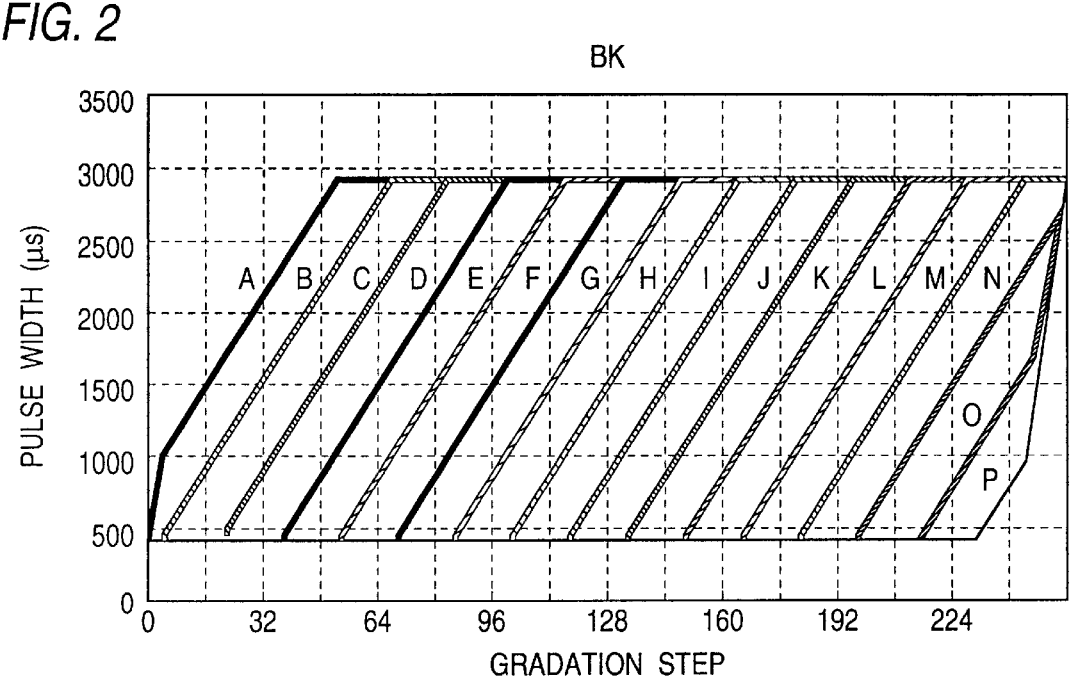
FIG. 2 is an illustration to show conversion characteristic of BK for a gradation conversion table.
Figure 3:
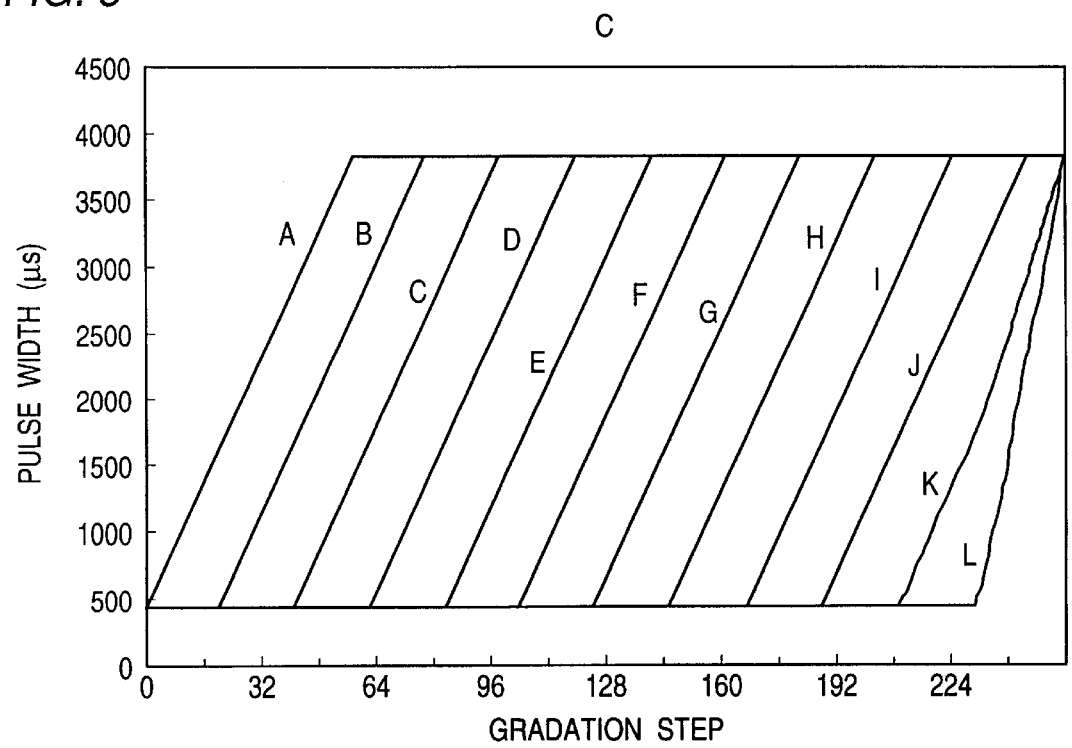
FIG. 3 is an illustration to show conversion characteristic of C for the gradation conversion table.
Figure 4:
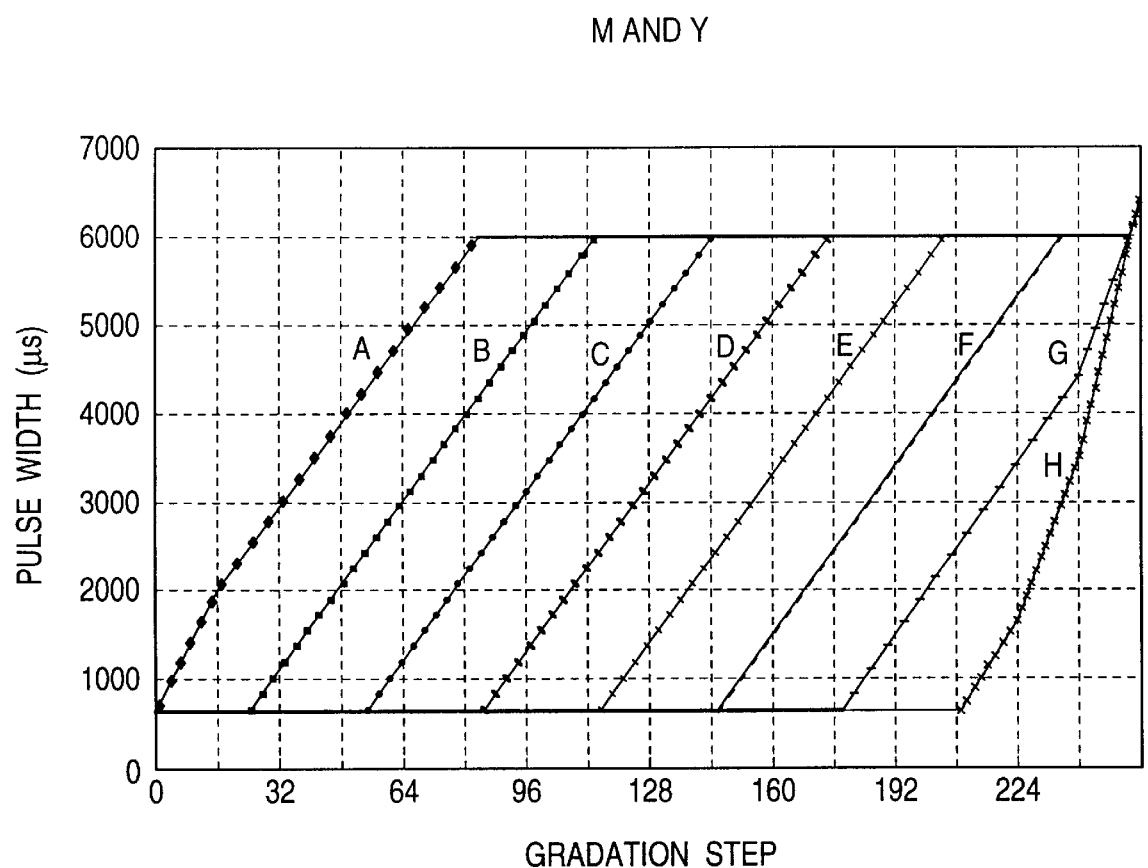
FIG. 4 is an illustration to show conversion characteristic M for the gradation conversion table.

FIG. 2 to FIG. 4 show examples of gradation conversion characteristics. FIG. 2 shows the BK color gradation conversion characteristic, FIG. 3 shows the C color gradation conversion characteristic, and FIG. 4 shows the M and Y color gradation conversion characteristics.

In FIG. 2 to FIG. 4, the horizontal axis denotes input image tone density and the vertical axis denotes the record pulse width (time) corresponding to the recorded dot size. Here, the input image tone density has 256 gradation steps (0–255).

For the gradation conversion characteristics shown in FIG. 2 to FIG. 4, characteristic curves to show the relationship between input image tone density and energy to generate recorded dots are set to at least five lines or more (16 lines of A to P in FIG. 2, 10 lines of A to J in FIG. 3, and eight lines of A to H in FIG. 4).

The bottom of the lines indicates a threshold value of the recorded dot generation. From the threshold level, the characteristic lines grow up in proportion to the increase of the tone density.

In the gradation conversion characteristics shown in FIG. 2 to FIG. 4, there are set at least three or more characteristic curves each having an energy value other than the maximum or minimum energy for an arbitrary density value in a halftone area. At the maximum tone density (step 255), characteristic curve energy is set a little high as compared with other tone areas (190 $\mu$s in FIG. 2, 220 $\mu$s in FIG. 3, 300 $\mu$s in FIG. 4), whereby "solid" flatness is improved.

In the minimum gradation value where energy of a print dot reaching substantially the maximum converted energy exists, the number of print dots with energy being substantially the minimum is set to a half or more of the total number of print dots.

Figure 5:
FIG. 5 is an illustration to show a conversion matrix for BK.
Figure 6:
FIG. 6 is an illustration to show a conversion matrix for C.
Figure 7:
FIG. 7 is an illustration to show a conversion matrix for M and Y.

FIG. 5 to FIG. 7 show matrixes (unit blocks) to indicate which conversion curve among energy conversion characteristics is selected. FIG. 5 shows a BK matrix, FIG. 6 shows a C matrix, and FIG. 7 shows an M matrix.

Each matrix is formed of a unit block. Each of the unit blocks of the matrixes consists of a different number of dots because of the same length and width and different subscanning resolution, and gradation conversion is executed in accordance with the gradation conversion characteristic defined by the relative position relationship in the block. Then, a different pulse width is assigned to each tone density and energy applied to each print dot in the unit block is determined.

In each matrix, element value "X" is a print dot to which little energy is applied with respect to any tone density and "1," "2," "3," . . . are print dots corresponding to characteristic curves "A," "B," "C," . . . in FIG. 2 to FIG. 4. In each color matrix, the resolution in the main scanning direction is 600 dpi and the resolution in the subscanning direction is 1200 dpi (dots per inch) (BK), 900 dpi (C), or 600 dpi (M). The matrix size in terms of the number of elements is 8 dots long by 4 dots wide (BK), 6 dots long by 4 dots wide (C), or 4 dots long by 4 dots wide (M). Since the BK matrix has a resolution of 1200 dpi in the subscanning direction, for example, if 150 blocks/inch are used as unit blocks, each unit block contains 32 print dots of 8 dots long by 4 dots wide and therefore there is a possibility that 32 types of gradation conversion characteristics at the maximum will become necessary. However, print dots converted in accordance with the same gradation conversion characteristic exist, thus 17 types of gradation conversion characteristics are assigned to 32 print dots. This assignment is executed to the matrixes BK, C, and M uniquely and to the Y matrix as random numbers.

The Y matrix has the same size (4 dots long by 4 dots wide) and resolution (600 dpi in the main scanning direction and 600 dpi in the subscanning direction) as the M matrix; print dot characteristic curves are determined with the matrixes such that the positions of matrix elements other than those assigned to "X" are made different in a random manner from one matrix to another.

If the sizes and resolutions of the color matrixes are set as described above, the matrixes on the image have the same size (length in the actual space rather than the number of elements) independently of colors.

Since a very large number of tone density-print energy conversion curves (gradation conversion characteristic curves) are set and three or more print dots having an intermediate energy value other than the maximum or minimum energy are set at the halftone area, continuous gradation can be realized easily and stably.

The matrix conditions are as follows:

BK Matrix
1. Subscanning resolution conversion: 600 to 1200 dpi
   Conversion of original data resolution 600 dpi to 1200 dpi by applying adjacent interpolation (subscanning direction adjacent pixel resolution value 128 gradation steps or more) and linear interpolation (subscanning direction adjacent pixel resolution value less than 128 gradation steps)
2. Block configuration:
   8 lines in subscanning direction
   4 lines in main scanning direction
3. Number of print dots in block: 32
4. Gradation conversion characteristic types: A to P
5. Gradation conversion characteristic assignment to print dot:
   Unique
6. Gradation conversion: 256 to 64 gradation steps
   Conversion of original gradation steps 256 to 64 according to conversion table
7. Pulse width assignment:
   Assignment of 64 gradation steps to pulse widths according to conversion table.

C Matrix
1. Subscanning resolution conversion: 600 to 900 dpi
   Conversion of original data resolution 600 dpi to 900 dpi by applying adjacent interpolation (subscanning direction adjacent pixel resolution value 128 gradation steps or more) and linear interpolation (subscanning direction adjacent pixel resolution value less than 128 gradation steps)
2. Block configuration:
   6 lines in subscanning direction
   4 lines in main scanning direction
3. Number of print dots in block: 24
4. Gradation conversion characteristic types: A to L
5. Gradation conversion characteristic assignment to print dot:
   Unique
6. Gradation conversion: 256 to 128 gradation steps Conversion of original gradation steps 256 to 128 according to conversion table
7. Pulse width assignment:
   Assignment of 128 gradation steps to pulse widths according to conversion table.

M Matrix
1. Subscanning resolution conversion: No conversion
   Original data resolution 600 dpi is not converted.
2. Block configuration:
   4 lines in subscanning direction
   4 lines in main scanning direction
3. Number of print dots in block: 16
4. Gradation conversion characteristic types: A to H
5. Gradation conversion characteristic assignment to print dot:
   Unique
6. Gradation conversion: 256 to 128 gradation steps
   Conversion of original gradation steps 256 to 128 according to conversion table
7. Pulse width assignment:
   Assignment of 128 gradation steps to pulse widths according to conversion table.

Y Matrix
1. Subscanning resolution conversion: No conversion
   Original data resolution 600 dpi is not converted.
2. Block configuration:
   4 lines in subscanning direction
   4 lines in main scanning direction
3. Number of print dots in block: 16
4. Gradation conversion characteristic types: A to H
5. Gradation conversion characteristic assignment to print dot:
   Gradation conversion characteristics are assigned to print dots 1–8 exclusively and as random.
6. Gradation conversion: 256 to 128 gradation steps
   Conversion of original gradation steps 256 to 128 according to conversion table
7. Pulse width assignment:
   Assignment of 128 gradation steps to pulse widths according to conversion table.

Processing of the gradation processing section 26 will be discussed with reference to FIG. 8 to FIG. 10.

Figure 8:
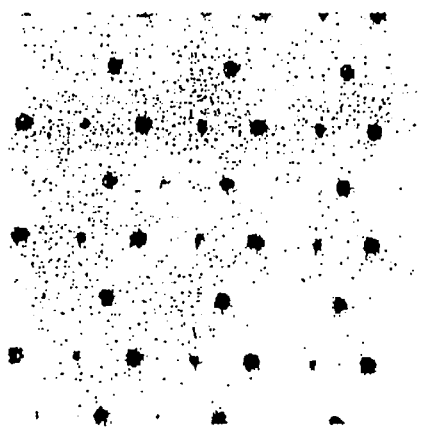
FIG. 8(a)–FIG. 8(b) is an enlarged view of BK highlight recorded dots.
Figure 8:
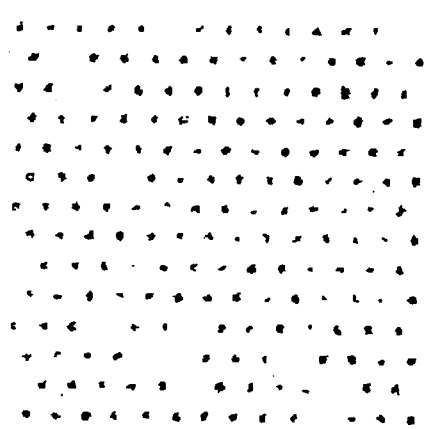
Figure 9:
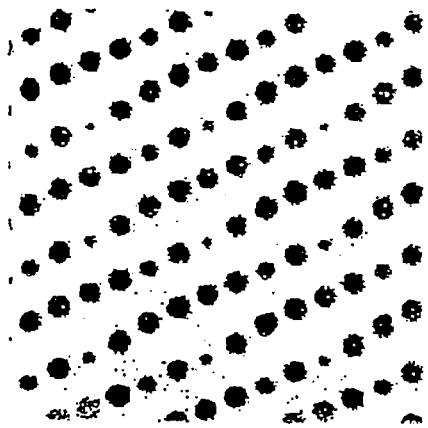
FIG. 9(a)—FIG. 9(a) is an enlarged view of BK highlight recorded dots.
Figure 9:
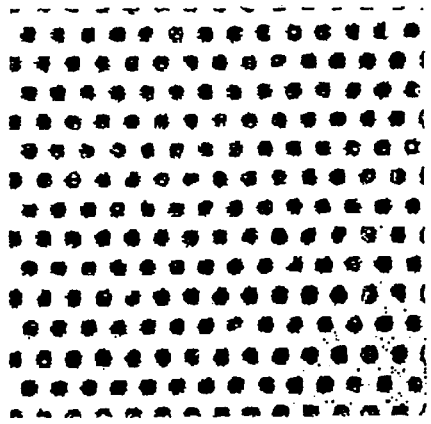
Figure 10:
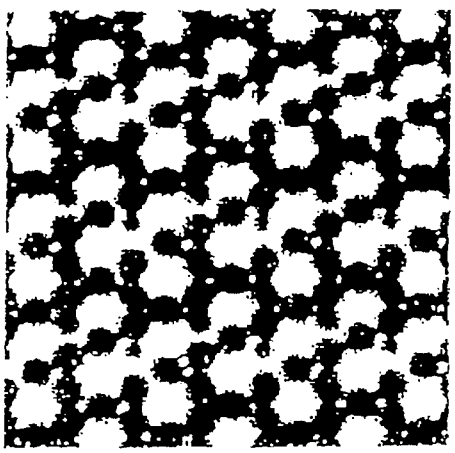
FIG. 10(a)–FIG. 10(b) is an enlarged view of BK shadow recorded dots.
Figure 10:
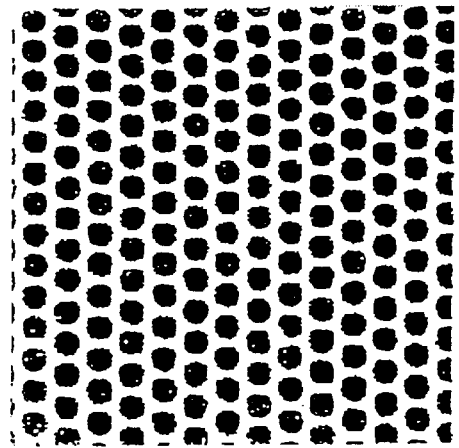

FIG. 8 is an enlarged view of BK highlight (step 64) recorded dots, FIG. 9 is an enlarged view of BK halftone (step 128) recorded dots, and FIG. 10 is an enlarged view of BK shadow (step 192) recorded dots; (a) shows recorded dots according to the embodiment and (b) shows conventional recorded dots.

Comparing the recorded dot arrangements in (a) and (b) of each figure, in FIG. 8, gradation is reproduced by large size and small numbers of recorded dots, so that loss of recorded dots easily occurring in highlight is inconspicuous. Thus, if recorded pixels at low density are formed on a white background, occurrence of roughness is avoided and reproducibility is improved.

Other examples of conversion processing using gradation conversion table will be discussed.

Figure 11:
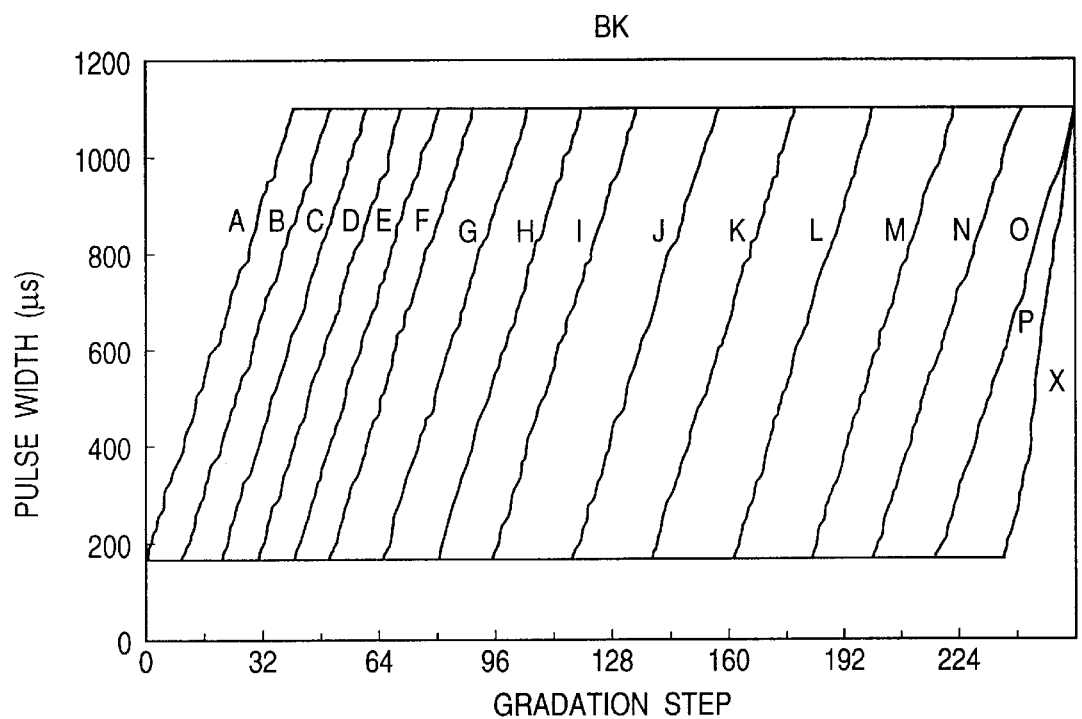
FIG. 11 is an illustration to show another conversion characteristic of BK for a gradation conversion table.
Figure 12:
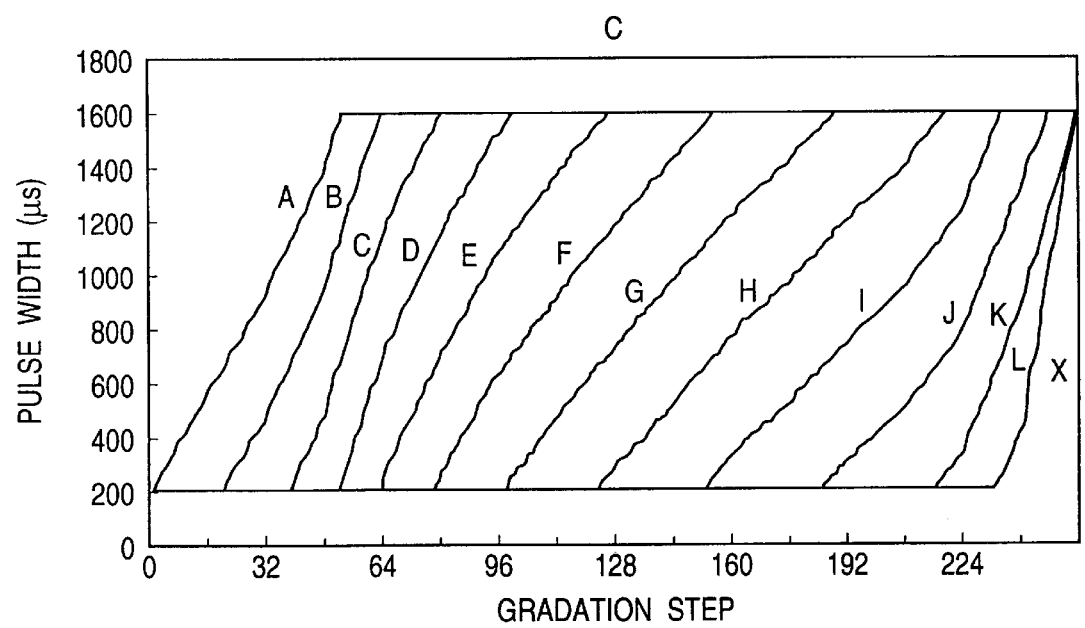
FIG. 12 is an illustration to show another conversion characteristic of C for the gradation conversion table.
Figure 13:
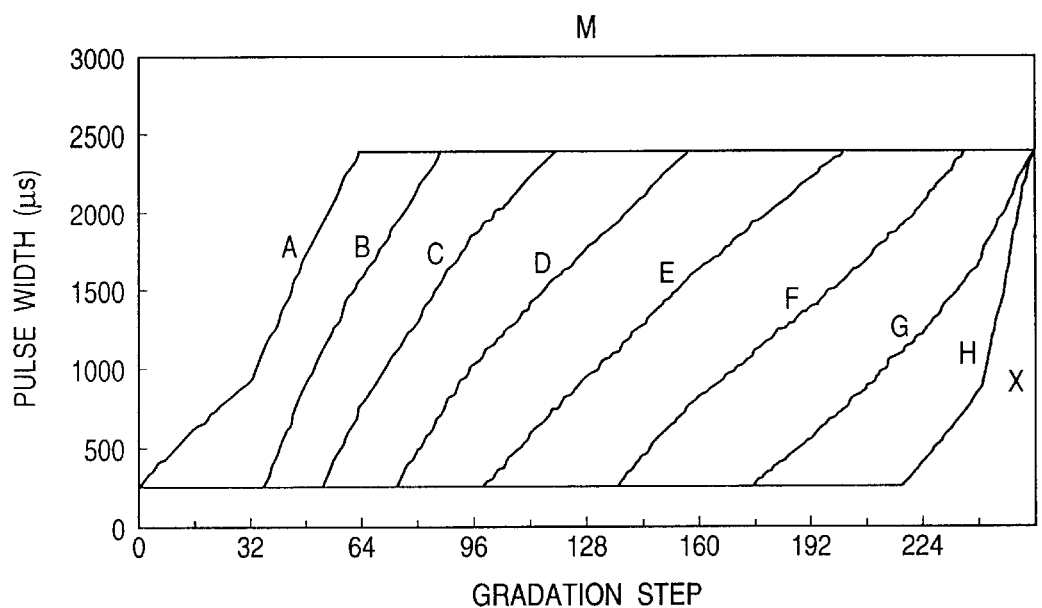
FIG. 13 is an illustration to show another conversion characteristic of M for the gradation conversion table.
Figure 14:
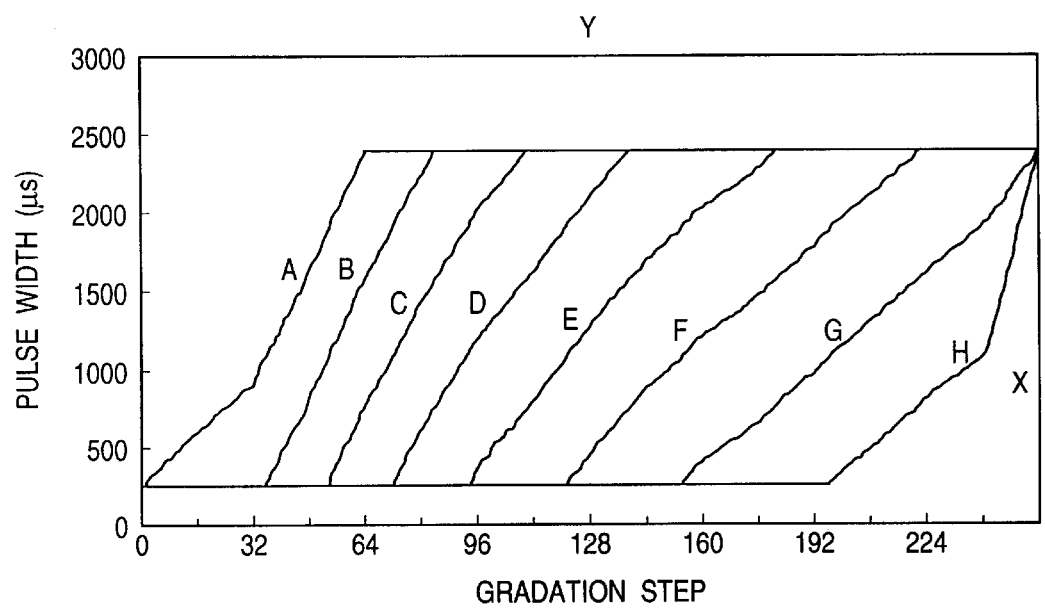
FIG. 14 is an illustration to show another conversion characteristic of Y for the gradation conversion table.

FIG. 11 to FIG. 14 show other examples of gradation conversion characteristics. FIG. 11 shows the BK gradation conversion characteristic, FIG. 12 shows the C gradation conversion characteristic, FIG. 13 shows the M gradation conversion characteristic, and FIG. 14 shows the Y gradation conversion characteristic. In FIG. 11 to FIG. 14, the horizontal axis denotes input image tone density and the vertical axis denotes the record pulse width (time) corresponding to the recorded dot size. The input image tone density has 256 gradation steps (0–255).

For the gradation conversion characteristics shown in FIG. 11 to FIG. 14 like those shown in FIG. 2 to FIG. 4, there are set at least five lines or more characteristic curves indicating the relationship between input image tone density values and energy to generate recorded dots (17 lines of A to P and X in FIG. 11, 12 lines of A to L and X in FIG. 12, and nine lines of A to H and X in FIG. 13 and FIG. 14). Here, conversion characteristic curve X is assigned to element "X" of each matrix shown in FIG. 5 to FIG. 7 and is set so that predetermined energy is applied only to the maximum tone density (step 255).

The BK, C, M, and Y gradation conversion characteristics shown in FIG. 11 to FIG. 14 differ from those shown in FIG. 2 to FIG. 4 in that line pitches of the gradation conversion characteristic curves vary. That is, the line pitches are widened gradually from the highlight area to the shadow area.

The gradation conversion characteristics shown in FIG. 11 to FIG. 13 are assigned to the matrixes shown in FIG. 5 to FIG. 7 respectively. The Y gradation conversion characteristic shown in FIG. 14 is assigned to the M m matrix shown in FIG. 7. At this time, the gradation conversion characteristic X is assigned to the matrix element "X" uniquely and the gradation conversion characteristics A to H are assigned to the positions of matrix elements other than "X" randomly.

Conversion tables 1 (for gradation conversion) and 2 (for pulse width assignment) in the color matrixes to obtain the gradation conversion characteristics shown in FIG. 11 to FIG. 14 are shown in FIG. 15 to FIG. 22.

Figure 23:
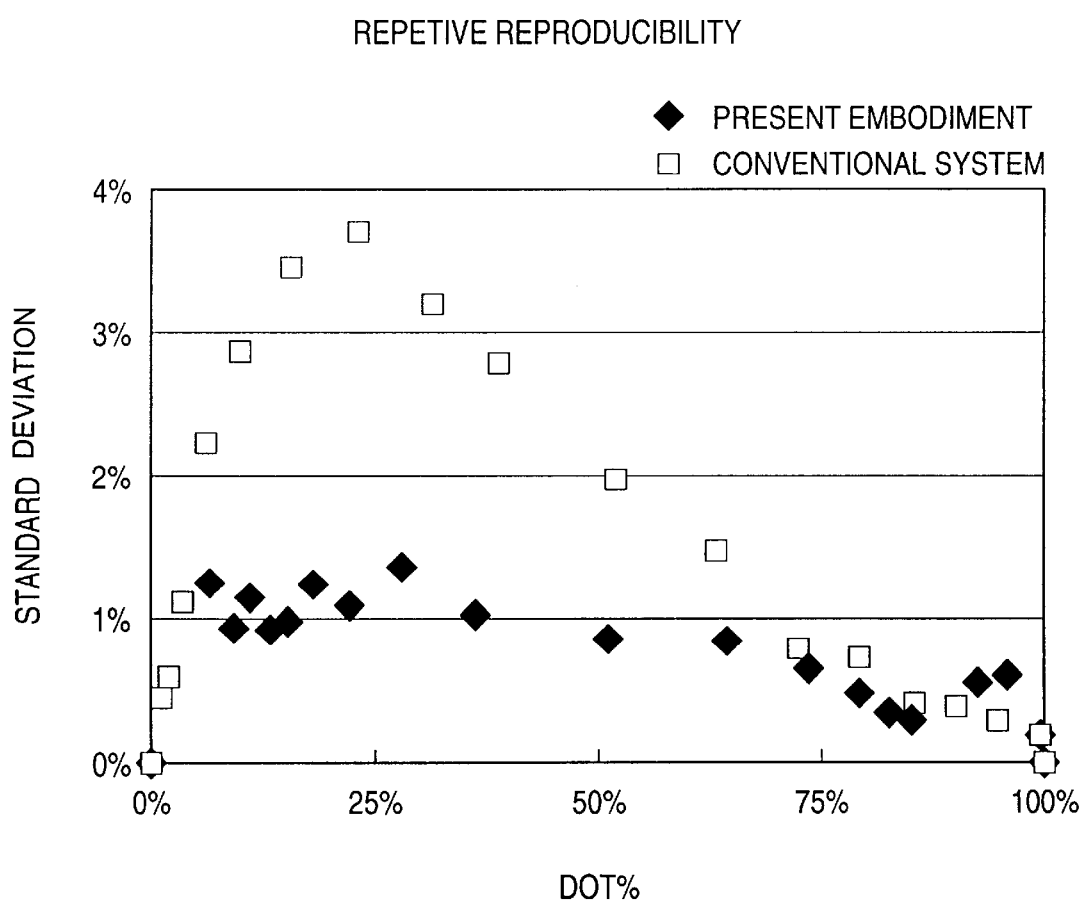
FIG. 23 is an illustration to show repetitive reproducibility of printing.

Printing with recorded dots according to the present embodiment (example) and printing with conventional recorded dots (control example) will be discussed with reference to FIG. 23, which shows reproducibility when repetitive printing is executed from highlight to shadow. The vertical axis indicates standard deviation and the horizontal axis indicates average density. As shown in FIG. 23, printing based on the present embodiment has small standard deviation, meaning that the repetitive reproducibility is high.

In the embodiment, BK recorded dots have been mainly described, but similar description is also applied to C, M, and Y. To superpose colors on each other to reproduce multiple colors, the subscanning periods of the colors are made different and the recorded dot positions are made different for each color, whereby continuity of gradation is improved and if superposition of the colors shifts, a sense of incongruity for visual sensation can be reduced.

An image formation system described in Japanese Patent Publication No. 2608808 is similar to the embodiment of the present invention. There is shown an example wherein four characteristic curves of gradation conversion table and two types of "energy values other than the maximum or minimum energy at the halftone area" exist. In this case, however, if printing is executed on a recording material having a thin ink layer, continuity of gradation cannot be stably realized. That is, it has been shown that if a condition of setting tone jump at gradation to visible level or less at one temperature and humidity is found out, when the temperature or humidity changes, the tone jump exceeds the visible level and therefore a sufficient effect cannot be obtained.

Then, to print on a recording material having a thin ink layer, it has been confirmed that at least five characteristic curves of gradation conversion table are set and at least three types of energy values other than the maximum or minimum energy at the halftone area are set, whereby a sufficient effect on a recording material having a thin ink layer can be obtained.

The image formation method described above is more advantageous if it is applied to a recording material having a thin ink layer. The following recording material disclosed in Unexamined Japanese Patent Publication No. Hei 7-117359 can be named as such a recording material:

Thermal transfer recording material having a substantially transparent thermal ink layer containing 30–70 parts by weight of a pigment and 25–60 parts by weight of an amorphous organic macromolecular polymer having a softening point at 40° C.–150° C., the thermal ink layer having a film thickness ranging from 0.2 $\mu$m to 1.0 $\mu$m wherein the diameter of each of particles of 70% or more of the pigment in the thermal ink layer is 1.0 $\mu$m or less and the optical reflection density of a transfer image is at least 1.0 or more on a white support.

As has been described heretofore, according to the present invention, the characteristic curves of a gradation conversion table indicating the relationship between tone density values and energy to generate recorded dots are set to at least five lines and there are set at least three types of energy values other than the maximum or minimum energy in an arbitrary tone density at the halftone area, whereby smoothly continuous gradation is provided. Further, in the minimum gradation value where a print dot with energy reaching substantially the maximum exists, the number of print dots with energy being substantially the minimum is set to a half or more of the total number of print dots, whereby even if recorded pixels at low density are formed on a white background, occurrence of roughness can be decreased remarkably.

Therefore, the image formation method can also be used for printing on a printed matter which is hard to say that characteristics thereof are always stable, and can provide a high-quality recording image.

What is claimed is:

1. A method for forming an image comprising the steps of:
   dividing an inputted image into a plurality of unit areas;
   preparing at least five gradation conversion tables relating a gradation value of of the inputted image to a dot generation energy value corresponding to a size of a dot to be printed;
   preparing a matrix dividing each of the unit areas into a plurality of element areas;
   dividing each of the unit areas into a plurality of the element areas by means of the matrix;
   assigning one of the gradation conversion tables prepared in said preparing step to each of the element areas in each of the unit areas; and recording dots according to the dot generation energy value obtained from the assigned gradation conversion table;

wherein the gradation conversion tables are prepared in such a manner that there exists at least three converted energy values other than a minimum and a maximum converted energy value at an arbitrary gradation value in a halftone density range, and wherein the gradation conversion tables are prepared in such a manner that a number of element areas in which the minimum value of the converted energy is assigned is more than half of the number of all the element areas when a minimum gradation level has the maximum value of converted energy.

2. A method for forming an image as set forth in claim 1, wherein the inputted image data includes a plurality of color plate image data, and said steps of dividing the inputted image data, preparing the gradation conversion tables, preparing the matrix, dividing the unit area into element areas, assigning one of the gradation conversion tables and recording dots is performed with respect to each of the plurality of color plate image data.

3. The image formation method as set forth in claim 2, wherein there are prepared at least three kinds of matrixes in which the numbers of the element areas arranged in one of the horizontal direction and the vertical direction thereof are different from each other.

4. The image formation method as set forth in claim 2, wherein the assignment of the gradation conversion tables to the element areas is random with respect to one of the plurality of color plate image data and is assigned according to a predetermined rule for the other of the plurality of color plate image data.

5. The image formation method as set forth in claim 2, wherein the assignment of the plurality of conversion tables to the each of the element areas are executed based on a predetermined rule with respect to the color plate image data other than one color plate image data.

6. The image formation method as set forth in claim 5, wherein the predetermined rule is different from each other for each of the plurality of color plate image data.

7. The image formation method as set forth in claim 4, wherein the one color plate image data is a color plate image data having the least density.

8. The image formation method as set forth in claim 7, wherein the plurality of color plate image data are image data of cyan, magenta, yellow and black plates, and one color plate image data is the image data of the yellow color plate.

9. A method for forming an image comprising the steps of:

receiving gradation value data of an input image;

converting the gradation value data to density data of the input image;

determining a plurality of gradation value conversion tables relating the gradation value data to a dot generation energy value corresponding to a size of dot to be printed;

dividing the input image into a plurality of element areas;

assigning one of the plurality of gradation value conversion tables to each of the plurality of element areas; and recording dots of various sizes according to the dot generation energy value obtained from the assigned gradation conversion table;

wherein the plurality of gradation conversion tables are prepared such that when a dot corresponding to a low gradation value is printed with a maximum dot generation energy value, a number of recorded dots at a minimum dot generation energy value is at least half the number of all recorded dots.

10. The method of claim 9, wherein at least five gradation value conversion tables are determined in said determining step.

11. The method of claim 10, wherein the plurality of conversion tables are prepared such that there are at least three converted energy values in a halftone density range that do not correspond to the maximum dot generation energy value or the minimum dot generation energy value.

12. The method of claim 10, wherein the steps of determining gradation value conversion tables, assigning the gradation value conversion tables and recording dots is performed for each of a plurality of color plate image data.

13. The method of claim 12, wherein assignment of gradation value conversion tables for one of the plurality of color plates is random and assignment of gradation value conversion tables for the other of the plurality of conversion plates is performed according to a predetermined rule.

14. The method of claim 13, wherein said one of the plurality of color plates has a minimum density.

15. The method of claim 12 wherein there are at least three color plates, and wherein dividing the input image into a plurality of element areas comprises dividing the input image into at least three different numbers of element areas depending on the color plate for subsequent assignment of gradation value conversion tables.

* * * * *